United States Patent

[11] 3,575,268

| [72] | Inventor | Shigehiro Kimata |
| | | Yokohama, Kansgawa Prefecture, Japan |
| [21] | Appl. No. | 856,048 |
| [22] | Filed | Sept. 8, 1969 |
| [45] | Patented | Apr. 20, 1971 |
| [73] | Assignee | Isuzu Motors Ltd. |
| | | Tokyo, Japan |

[54] AUTOMATIC CLEARANCE-ADJUSTING MEANS FOR DISC BRAKE
8 Claims, 8 Drawing Figs.

[52] U.S. Cl. .................................................. 188/196,
188/71.8, 188/216
[51] Int. Cl. ............................................... F16d 65/54,
F16d 55/18
[50] Field of Search ............................................ 188/71.7,
71.8, 72.3, 79.5 (GE), 196 (P) (R), 216

[56] References Cited
UNITED STATES PATENTS
2,548,868  4/1951  Christenot ................... 188/79.5(GE)
3,194,349  7/1965  Kershner et al. ............... 188/196(R)X
3,377,076  4/1968  Burnett ........................ 188/196(P)UX
3,482,664  12/1969  Bachmann ..................... 188/196(R)
FOREIGN PATENTS
317,743  8/1929  Great Britain ................ 188/196(R)

*Primary Examiner*—Duane A. Reger
*Attorney*—Otto John Munz

ABSTRACT: An automatic clearance-adjusting means for a disc brake, wherein spaced annular grooves are provided in parallel with each other on the circumference of a piston having brake pads at its one end, and resilient means is provided on a cylinder so as to engage with said grooves, whereby the clearance between a brake disc and the brake pads is always maintained within a predetermined limit by displacing the engaged position of said grooves with said resilient means.

PATENTED APR 20 1971

INVENTOR.
SHIGEHIRO KIMATA

BY
ATTORNEY

INVENTOR.
SHIGEHIRO KIMATA
BY
ATTORNEY

AUTOMATIC CLEARANCE-ADJUSTING MEANS FOR DISC BRAKE

BRIEF SUMMARY OF THE INVENTION

This invention relates to an automatic clearance-adjusting apparatus to maintain the clearance between the disc brake and the brake pads of a disc brake within a predetermined limits.

A conventional disc brake comprises a brake disc rotating together with the wheels and brake pads disposed in opposite relation to both side faces of said brake disc so as to be engaged with and disengaged from the brake disc. Movements of the brake pads are caused by brake operating means which consists of a piston having said brake pad at one end thereof and a hydraulic cylinder freely slidably accommodating said piston.

In practice, it is required to make engagement between the brake disc and the brake pads with minimum amount of oil hydraulic power and, therefore, it is necessary to provide automatic clearance-adjusting means which compensates wear of the brake pads thereby keeping the clearance between the brake disc and the brake pads within a predetermined limit. There have been customarily two systems for such clearance adjustment:

In one system, the cylinder is provided with an adjusting pin by means of a clamp so as to set to a reference point by a frictional force. When the clearance between the brake disc and brake pads exceeds the predetermined limit, due to wear of said brake pads a spacer attached to said piston and the head of said adjusting pin are placed in association with each other, thereby the piston being advanced by overcoming the friction force of said clamp a return of said piston, when said brake is released, is made by the restoring force of a spring provided between said spacer and said adjusting pin. In the other system, the circumference of the piston is covered with rubber. This piston is returned at the time of released brake by a restoring force which is caused by elastic deformation of the rubber due to a friction force between said rubber and the inside surface of the cylinder at the time of movements of said piston. The piston is advanced when the clearance between the brake disc and brake pads exceeds the predetermined limit with the result that the elastic deformation of said rubber exceeds its predetermined limit. However the former system is rather structurally complicated with too much parts used, and necessarily requires higher manufacturing costs. On the other hand, the latter is simple in structure, but suffers from its operational uncertainty, unreliability as well as questionable durability, because it utilizes the frictional and the elastic forces of rubber.

An object of this invention is to provide automatic clearance-adjusting means for a disc brake, which can be manufactured with a structural simplicity and at low costs.

Another object of this invention is to provide automatic clearance-adjusting means which is superior in operational certainty, reliability and durability.

Still another object of this invention is to provide such means which is able to readily set a reference point from outside of the machine so that the adjustment may be easily accomplished.

The foregoing and other objects and novel features of this invention will be made clear from the following description with reference to the accompanying drawings.

BRIEF DESCRIPTION OF THE DRAWINGS

FIGS. 7 and 8 show other illustrative embodiments of this invention, wherein FIG. 7 is an elevational, a part being broken away, of the automatic clearance-adjusting means of this invention, and FIG. 8 is a sectional view substantially taken along the line 8–8 of FIG. 7.

DETAILED DESCRIPTION OF THE ILLUSTRATIVE EMBODIMENTS

Figure 1:
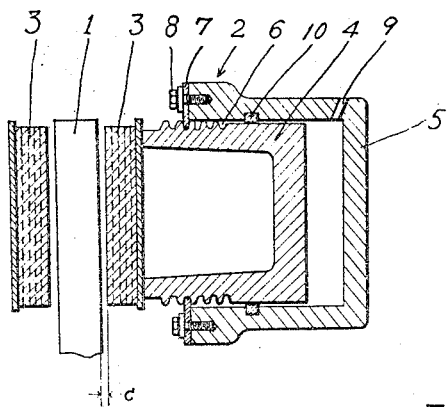
FIG. 1 is a longitudinal sectional view illustrating a preferred embodiment of automatic clearance-adjusting means according to the present invention, with the brake being shown in released condition.
Figure 2:
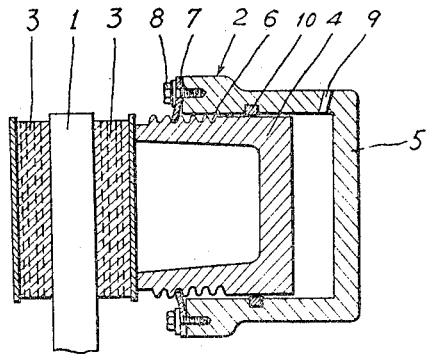
FIG. 2 is a longitudinal sectional view of the same means when the brake is in operation.
Figure 3:
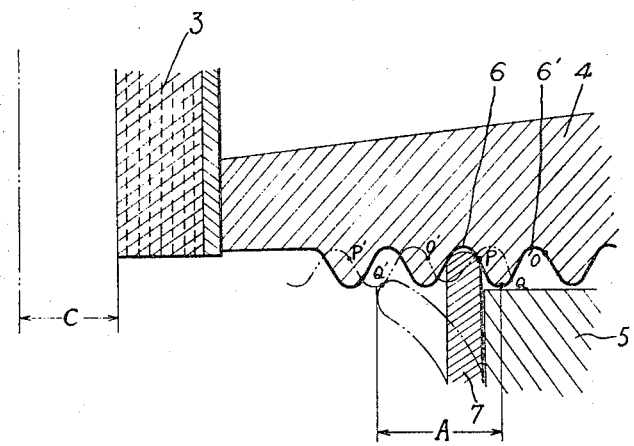
FIG. 3 is a fragmentary enlarged view showing the state of an annular resilient plate, in which a piston with a brake pad is forced forwardly by a pitch of grooves provided on the piston due to wear of the brake pads.

In FIGS. 1, 2 and 3, reference numeral 1 indicates a brake disc which is mounted on an axle (not shown in the drawing) so as to rotate with the axle. Brake actuating means 2 to brake the rotation of said brake disc 1 consists of two brake pads 3, 3 disposed in opposition to each other at both sides of said brake disc 1, pistons 4 each provided at one end thereof with the brake pad 3, and cylinders 5 each accommodating therein the piston 4 for freely sliding movement. Reference numeral 6 indicates spaced annular grooves provided in parallel to each other on the circumference of this piston 4. An annular resilient plate 7 is fitted into any one of the grooves 6 at its inner peripheral edge, and is securely fixed to the cylinder 5 by suitable securing means such as a stud bolt. 9 indicates an oil passage provided on the cylinder 5. 10 indicates a seal inserted into the inside the cylinder 5.

Referring now to FIG. 1, there is shown the automatic clearance adjusting means of this invention incorporated into the brake which is in its released condition. The brake pad 3 is kept away from the brake disc 1 at the distance of the clearance C without performing a braking action. When the operator of a vehicle depresses a brake pedal to operate a master cylinder (not shown) normally used, the pressure oil enters the cylinder 5 through the oil passage 9 and pushes out the piston 4, thus enabling the brake disc 1 to be put into the braking action by thrusting the brake pads 3 into frictional face-to-face engagement with the brake disc 1 as shown in FIG. 2. At this time, the annular resilient plate 7 is deformed with the movements of the grooves 6 provided on the periphery of said piston 4 following the movement of the piston 4. This causes the reaction force in said resilient plate 7 to force the piston 4 back into the cylinder 5. Nevertheless a braking action is performed because the force of pushing out the piston 4 by the oil pressure within the cylinder 5 is far stronger than the reaction force of said resilient plate. When the operator of the vehicle releases the brake pedal, the supply of pressure oil is cut off with the result the operating force for the piston 4 being entirely lost, and said piston 4 is pushed back into the cylinder 5 by means of the restoring force of the resilient plate. After the brake pads 3 have been worn out after the use of a long period of time, the brake pads 3 should not come into contact with the brake disc 1 merely depending upon the amount of travel of the piston 4, which corresponds to the maximum amount of deformation of the resilient plate 7 within a particular groove 6, that is to say, as shown in FIG. 3. The clearance C between the brake disc 1 and the brake pads 3, namely, the necessary amount of travel of the piston 4; will become somewhat larger than the maximum amount of shift of the piston 4, within the limit of which the resilient plate 7 does not come out of its associated groove 6 with the displacement of the piston.

The automatic clearance-adjusting means in accordance with this invention herein disclosed is characterized in that under the above-mentioned condition as shown in FIG. 3 the deficient amount of travel of the piston 4 is compensated by the shift of the resilient plate 7 from the groove 6 now associating therewith to the next groove 6'. Thus, the braking action of the brake pads 3 is newly effected with the resilient plate 7 shifted from the groove 6 to 6'.

A further detailed description is to make clear that, when the clearance between the brake disc 1 and the brake pads 3 is maintained within the predetermined limit value, that is to say, within the limit of $C<A$, the resilient plate 7 in the groove 6 is deformed merely due to the shift of said groove 6, but when the brake pads 3 have been worn down to the state of $C>A$, the piston 4 is forced to advance for more than the maximum amount of its normal travel in the association of the resilient plate 7 with the groove 6. Hence, the resilient plate 7, which has been in association with the groove 6 at the point marked P, as a result of the shift of P point to P' point due to movement of the piston 4, comes into contact with the crest of the groove 6 at the point marked Q, moves to the groove 6' beyond said crest of the groove 6 and further to the point marked 0', whereby the braking action is effected with respect to the 0' point as a reference point.

Consequently the piston 4 is pushed forward by a pitch, and the clearance between the brake disc 1 and the brake pads 3 is again kept within the required limit.

When the brake pedal is released after the resilient plate 7 has been shifted from the groove 6 to 6' with the result of the completion of a braking action, the piston 4 is pushed back into the cylinder 5 by the restoring force of the resilient plate 7, and the brake regains the released state.

As aforementioned, the automatic clearance-adjusting means in accordance with this invention, regardless of a few parts used and very simple construction, has many advantages from the viewpoint of the operational security and reliability, easy adjustments in favor of the reference point capable of being easily set from outside the machine.

Figure 4:
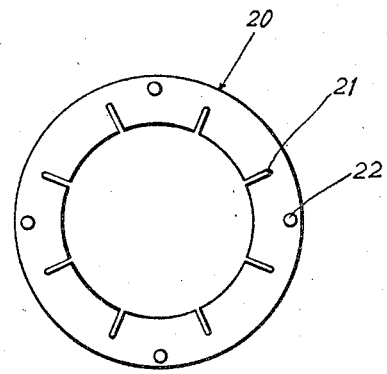
FIGS. 4 to 6 are plans showing various examples of annular resilient plates used in the automatic clearance adjusting means of this invention.
Figure 5:
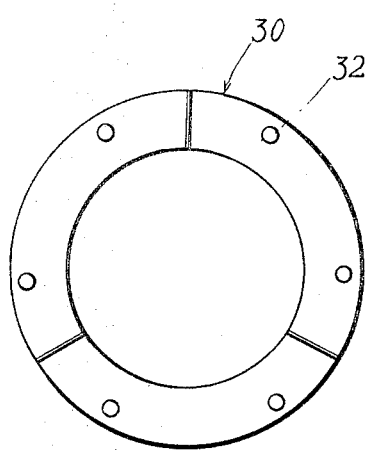
Figure 6:
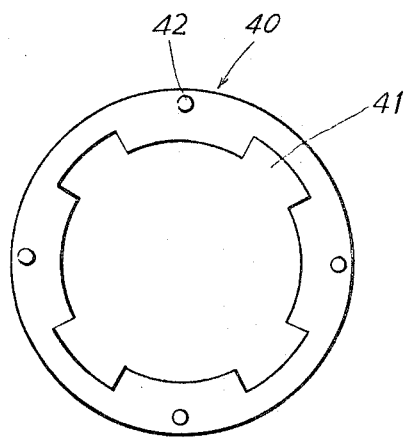

In FIGS. 4 to 6, various examples of resilient plate respectively to be used in the automatic clearance-adjusting means of this invention are shown, of which FIG. 4 shows a modified annular resilient plate 20 which is provided with slits 21 extended radially from the inner peripheral edge of the plate 20, and also a plural number of circumferentially spaced holes 22 drilled for inserting clamping bolts.

The resilient plate of this type shall have weaker resilient force than that of the plate having no slit, but it features to facilitate deformation due to movements of the piston.

FIG. 5 shows another modified resilient plate 30 composed of three sectors which respectively have drilled holes 32 for inserting clamping bolts.

The resilient plate of this type may be easily deformed due to movements of the piston, and particularly features to facilitate its association with the grooves in the piston in case of assembling it with the cylinder.

In the drawing, although the resilient plate 30 is shown divided into three sectors, it may be sufficient to divided into at least two sectors.

FIG. 6 shows a still another modified resilient plate 40 provided with several notches 41 at the inner peripheral edge portion, and also provided with circumferentially spaced through holes 42 drilled for inserting the clamping bolts.

The resilient plate of the last-mentioned type, similar to that shown in FIG. 4, features to facilitate the deformation due to movements of the piston, and also may be used with the piston provided on the periphery thereof with several grooves in parallel to each other and in perpendicular to the longitudinal axis of the piston, as well as with the piston provided with the annular grooves.

Figure 7:
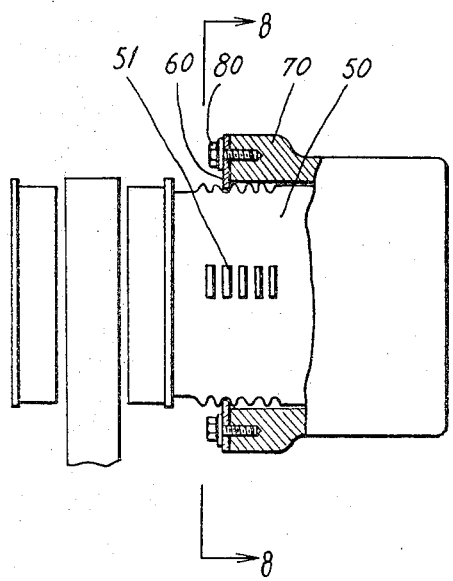
Figure 8:
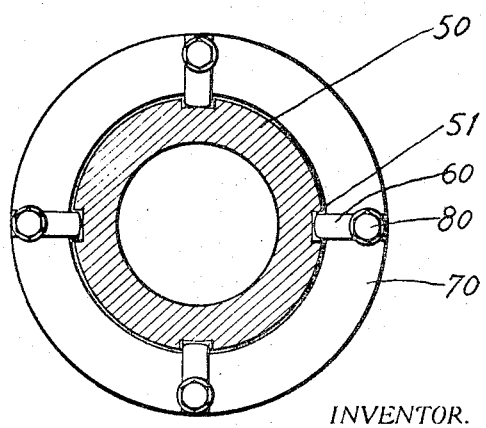

FIGS. 7 and 8 show other a modified embodiment of the automatic clearance-adjusting means in accordance with this invention, in which the piston 50 is provided the periphery thereof with circumferentially spaced notches 51 located in the cross-sectional plane perpendicular to the axial direction, said notches 51 being also axially disposed in plural lines, and tongue pieces 60 each made of leaf spring are secured radially to the cylinder 70 by fixing means such as stud bolts in such a manner that their radially innermost ends are engaged with the notches 51, respectively.

In accordance with this embodiment, because the resilient tongue 60 is small in size and simple in shape, there is no difficulty to provide the resilient members uniform in quality by heat treatment.

The resilient tongues according to the last-mentioned embodiment may be advantageously applied to the piston provided with the annular groove other than the piston provided with the notches as shown in FIG. 7.

Having fully described our invention, it is to be understood that we do not wish to be limited to the details herein set forth or to the details illustrated in the drawings, whether such details be as to structures or materials, but our invention is of the full scope of the appended claims.

I claim:

1. In a disc brake comprising a brake disc, two brake pads disposed in opposition to each other at the both sides of said brake disc for braking thereof, pistons provided at their ends with said brake pads and brake actuating means provided with cylinders freely slidably accommodating therein said pistons; automatic clearance-adjusting means wherein said pistons are each provided on the periphery thereof with a plural number of grooves in parallel to each other and perpendicular to the longitudinal axis thereof and resilient means engaged with any one of said grooves, said resilient means being securely fixed to said cylinder in order to return the piston at the time when the brake is released, whereby when the clearance between the brake disc and the brake pads exceeds the predetermined limit due to wear of the brake pads, said resilient means is shifted into the engagement with the next groove adjacent to said groove currently engaged with said resilient means, so that said piston is moved by one pitch of said grooves to thereby keep said clearance within the predetermined limit.

2. In a disc brake comprising a brake disc, two brake pads disposed in opposition to each other at the both sides of said brake disc for braking thereof, pistons provided at their ends with said brake pads, and brake actuating means provided with cylinders freely slidably accommodating therein said pistons; automatic clearance-adjusting means, wherein said pistons are each provided on the periphery thereof with a plural number of annular grooves in parallel to each other, resilient means engaged with any one of said grooves, said resilient means being securely fixed to the cylinder in order to act to return the piston at the time when the brake is released, whereby when the clearance between the brake disc and the brake pads exceeds the predetermined limit due to wear of the brake pads, said resilient means is shifted into engagement with the next groove adjacent said groove currently engaged with said resilient means, so that said piston is moved by one pitch of said grooves thereby to keep said clearance within the predetermined limit.

3. In a disc brake comprising a brake disc, two brake pads disposed in opposition to each other at the both sides of said brake disc for braking thereof, pistons provided at their ends with said brake pads, and brake-actuating means provided with cylinders freely slidably accommodating therein said pistons; automatic clearance adjusting means, wherein said pistons are each provided with circumferentially spaced notches on the periphery of said piston in a cross-sectional plane perpendicular to the axis of said piston, said notches being axially disposed in plural lines, and resilient means engaged with a set of notches several plate springs in association located on a particular cross-sectional plane, said resilient means being securely fixed to the cylinder to act to return the piston at the time when the brake is released, whereby when the clearance between the brake disc and the brake pads exceeds the predetermined limit due to wear of the brake pads, said resilient means are shifted into engagement with the next set of notches adjacent to said set of notches, so that said piston is moved by one pitch of said notches to thereby keep said clearance within predetermined limit.

4. The automatic clearance adjusting means claimed in claim 2, in which said resilient means comprises a resilient annular plate, the inner peripheral edge thereof being adapted to be engaged with the grooves provided on the piston.

5. The automatic clearance adjusting means claimed in claim 4, in which said resilient annular plate has circumferentially spaced slits each extended radially from the inner peripheral edge thereof.

6. The automatic clearance adjusting means claimed in claim 4, in which said resilient annular plate is divided into at least two sectors.

7. The automatic clearance adjusting means claimed in claim 1, in which said resilient means comprises a resilient annular plate having circumferentially spaced notches on the inner peripheral edges thereof.

8. The automatic clearance adjusting means claimed in claim 1, in which said resilient means comprises a plural number of circumferentially spaced resilient tongues attached radially to the cylinder in such a manner that their radially innermost ends are respectively engaged with the notches provided on the piston.